(12) United States Patent
Zhao et al.

(10) Patent No.: US 11,178,428 B2
(45) Date of Patent: Nov. 16, 2021

(54) IMAGE SPLICING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Yongfei Zhao, Shenzhen (CN); Liang Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/810,950

(22) Filed: Mar. 6, 2020

(65) Prior Publication Data

US 2020/0213620 A1 Jul. 2, 2020

Related U.S. Application Data

(63) Continuation of application No. PCT/CN2018/105700, filed on Sep. 14, 2018.

(30) Foreign Application Priority Data

Sep. 15, 2017 (CN) .......................... 201710831538.0

(51) Int. Cl.
*H04N 19/597* (2014.01)
*H04N 19/513* (2014.01)
(Continued)

(52) U.S. Cl.
CPC ......... *H04N 19/597* (2014.11); *H04N 13/156* (2018.05); *H04N 19/521* (2014.11);
(Continued)

(58) Field of Classification Search
CPC .. H04N 19/597; H04N 19/521; H04N 13/156; H04N 2013/0077; H04N 2013/0085; G06T 3/40; G06T 3/4038
See application file for complete search history.

(56) References Cited

U.S. PATENT DOCUMENTS 6,469,710 B1 10/2002 Shum et al.
2005/0157348 A1* 7/2005 He ....................... H04N 1/4052
358/3.05
(Continued)

FOREIGN PATENT DOCUMENTS

CN 103841297 A 6/2014
CN 104835115 A 8/2015
(Continued)

OTHER PUBLICATIONS

The World Intellectual Property Organization (WIPO) International Search Report for PCT/CN2018/105700 dated Dec. 19, 2018 6 Pages (including translation).
(Continued)

*Primary Examiner* — Nasim N Nirjhar
(74) *Attorney, Agent, or Firm* — Anova Law Group, PLLC

(57) ABSTRACT

An image splicing method includes obtaining a first overlapping image and a second overlapping image from a first image and a second image to-be-spliced. The method also includes determining a motion vector from each pixel in the first overlapping image to a corresponding pixel in the second overlapping image, to obtain an optical flow vector matrix; according to the optical flow vector matrix, remapping the first overlapping image to obtain a first remapping image, and remapping the second overlapping image to obtain a second remapping image; and merging the first remapping image and the second remapping image, to obtain a merged image of the first overlapping image and the
(Continued)

second overlapping image, and determining a spliced image of the first image and the second image according to the merged image.

16 Claims, 10 Drawing Sheets

(51) Int. Cl.
　　*H04N 13/156*　　(2018.01)
　　*H04N 13/00*　　(2018.01)
(52) U.S. Cl.
　　CPC ............... *H04N 2013/0077* (2013.01); *H04N 2013/0085* (2013.01)

(56) References Cited

U.S. PATENT DOCUMENTS

| | | | |
|---|---|---|---|
| 2006/0239571 A1* | 10/2006 | Dong | ............... G06T 7/32 382/236 |
| 2010/0165206 A1* | 7/2010 | Nestares | ............... G06T 5/002 348/607 |
| 2014/0219551 A1 | 8/2014 | Tang | |
| 2015/0156476 A1 | 6/2015 | Kobayashi et al. | |

FOREIGN PATENT DOCUMENTS

| | | | |
|---|---|---|---|
| CN | 105976320 A | | 9/2016 |
| CN | 106815802 A | * | 6/2017 |
| CN | 106815802 A | | 6/2017 |

OTHER PUBLICATIONS

Korean Intellectual Property Office (KIPO) Office Action 1 for 2020-007040 dated Mar. 23, 2021 9 Pages (including translation).
The European Patent Office (EPO) The Extended European Search Report for 18856585.7 dated Jun. 25, 2020 12 Pages.
Javier Sanchez et al., "Computing inverse optical flow," Pattern Recognition Letters, vol. 52, Jan. 15, 2015 (Jan. 15, 2015), pp. 32-39. 8 pages.
Zhenhua Qu et al., "Detect Digital Image Splicing with Visual Cues," Jun. 8, 2009 (Jun. 8, 2009), Pervasive: International Conference On Pervasive Computing; [Lecture Notes in Computer Science; Lect.Notes Computer], Springer, Berlin, Heidelberg, pp. 247-261. 15 pages.
Indian Patent Office Examination report for Application No. 202047010295 dated Aug. 3, 2021 6 pages.

* cited by examiner

Calculate a first transition mapping matrix and a second transition mapping matrix according to the optical flow vector matrix and the transition weight matrix, where the first transition mapping matrix is a transition mapping matrix from the first overlapping image to the second overlapping image, and the second transition mapping matrix is a transition mapping matrix from the second overlapping image to the first overlapping image — S1031

Remap the first overlapping image by using the first transition mapping matrix, to obtain the first remapping image; and remap the second overlapping image by using the second transition mapping matrix, to obtain the second remapping image — S1032

FIG. 2D

Determine a merging weight of a corresponding element according to a relationship between a transition weight of each element in the overlapping matrix and a preset threshold, and form a merging weight matrix by using merging weights of all elements in the overlapping matrix — S1041

Blend the first remapping image and the second remapping image by using the blending weight matrix — S1042

FIG. 2E

Establish respective Laplacian pyramids of the first remapping image and the second remapping image, and establish a Gaussian pyramid of the merging weight matrix — S10421

Merge the Laplacian pyramid of the first remapping image and the Laplacian pyramid of the second remapping image by using the Gaussian pyramid, to obtain a merging pyramid — S10422

Perform image restoration on the merging pyramid, to obtain the blended image — S10423

FIG. 2F

IMAGE SPLICING METHOD AND APPARATUS, AND STORAGE MEDIUM

RELATED APPLICATIONS

This application is a continuation application of PCT Patent Application No. PCT/CN2018/105700, filed on Sep. 14, 2018, which claims priority to Chinese Patent Application No. 201710831538.0, entitled "IMAGE SPLICING METHOD AND APPARATUS, AND STORAGE MEDIUM" filed with the China National Intellectual Property Administration on Sep. 15, 2017, content of all of which is incorporated by reference in its entirety.

FIELD OF THE TECHNOLOGY

This application relates to the field of image processing technologies and, in particular, to an image splicing method, an image splicing apparatus and a storage medium.

BACKGROUND OF THE DISCLOSURE

A 360-degree panoramic video can provide a user with a more vivid immersive watching experience than that of a conventional video with a limited field of view, and therefore has gradually become one of main types of contents in the field of virtual reality. There are currently a relatively small quantity of single-lens systems for capturing a panoramic video. Consequently, a panoramic video is usually formed by splicing videos captured by a plurality of cameras or a plurality of lens systems, but the spliced video often has splicing error affecting user experience.

The disclosed methods and systems are directed to solve one or more problems set forth above and other problems.

SUMMARY

Embodiments of the present disclosure provide an image splicing method and apparatus, and a storage medium.

According to one aspect, an embodiment of the present disclosure provides an image splicing method. The method may be performed by a server or a terminal device. The method includes obtaining a first overlapping image and a second overlapping image from a first image and a second image. The first overlapping image is an area, in a first image, overlapped with a second image; the second overlapping image is an area, in the second image, overlapped with the first image; and the first image and the second image are to-be-spliced neighboring images. The method also includes determining a motion vector from each pixel in the first overlapping image to a corresponding pixel in the second overlapping image, to obtain an optical flow vector matrix; according to the optical flow vector matrix, remapping the first overlapping image to obtain a first remapping image, and remapping the second overlapping image to obtain a second remapping image; and merging the first remapping image and the second remapping image, to obtain a merged image of the first overlapping image and the second overlapping image, and determining a spliced image of the first image and the second image according to the merged image.

According to another aspect, an embodiment of the present disclosure provides an image splicing apparatus. The apparatus includes at least one memory storing computer instructions; and at least one processor coupled to the at least one memory to execute the computer instructions to perform: obtaining a first overlapping image and a second overlapping image from a first image and a second image, wherein the first overlapping image is an area, in a first image, overlapped with a second image; the second overlapping image is an area, in the second image, overlapped with the first image; and the first image and the second image are to-be-spliced neighboring images; determining a motion vector from each pixel in the first overlapping image to a corresponding pixel in the second overlapping image, to obtain an optical flow vector matrix; according to the optical flow vector matrix, remapping the first overlapping image to obtain a first remapping image, and remapping the second overlapping image to obtain a second remapping image; and merging the first remapping image and the second remapping image, to obtain a merged image of the first overlapping image and the second overlapping image, and determining a spliced image of the first image and the second image according to the merged image.

According to another aspect, an embodiment of the present disclosure provides a non-volatile computer-readable storage medium. The non-volatile computer-readable storage medium stores computer program instructions executable by at least one processor to perform: obtaining a first overlapping image and a second overlapping image from a first image and a second image, wherein the first overlapping image is an area, in a first image, overlapped with a second image; the second overlapping image is an area, in the second image, overlapped with the first image; and the first image and the second image are to-be-spliced neighboring images; determining a motion vector from each pixel in the first overlapping image to a corresponding pixel in the second overlapping image, to obtain an optical flow vector matrix; according to the optical flow vector matrix, remapping the first overlapping image to obtain a first remapping image, and remapping the second overlapping image to obtain a second remapping image; and merging the first remapping image and the second remapping image, to obtain a merged image of the first overlapping image and the second overlapping image, and determining a spliced image of the first image and the second image according to the merged image.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

FIG. 2D is a schematic flowchart of remapping a first overlapping image and a second overlapping image according to a transition weight matrix and an optical flow vector matrix according to an embodiment of the present disclosure;

FIG. 2E is a schematic flowchart of image blending according to an embodiment of the present disclosure;

FIG. 2F is a schematic flowchart of multiresolution blending according to an embodiment of the present disclosure;

DESCRIPTION OF EMBODIMENTS

The technical solutions in the embodiments of the present disclosure will be described below with reference to the accompanying drawings. It is obvious that the embodiments to be described are only a part, rather than all, of the embodiments of the present disclosure. Other embodiments obtained by a person of ordinary skill in the art based on the embodiments of the present disclosure without creative efforts shall fall within the protection scope of the present disclosure.

Figure 1:
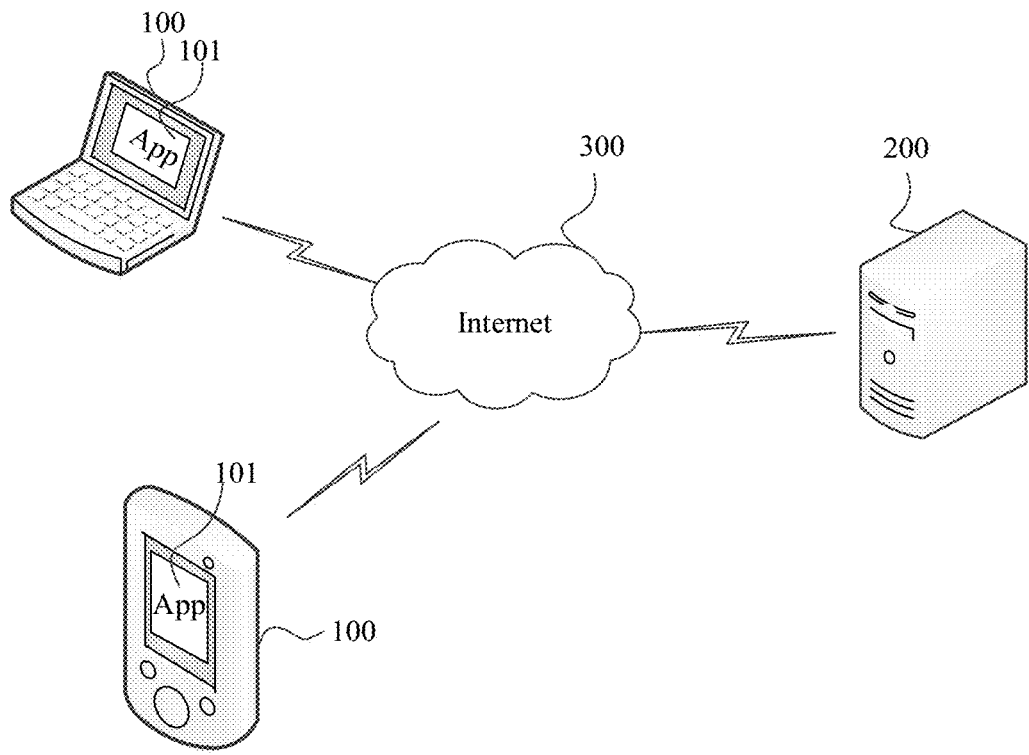
FIG. 1 is a schematic architectural diagram of a system according to an embodiment of the present disclosure.

The present disclosure provides an image splicing method, and a system architecture to which the method is applicable is shown in FIG. 1. The system includes: a terminal device 100 and a server 200, and the terminal device 100 and the server 200 may be connected to each other through a communications network 300.

The terminal device 100 may be a smartphone or computer of a user, or may be a camera, a lens system or the like, clients of various types of application software may be installed in the terminal device, and the user may log in to and use these clients. For example, an App 101 in FIG. 1 is a client that can perform image splicing.

The server 200 may be one server, or may be a server cluster, and corresponding to the client installed in the terminal device 100, may provide a corresponding image splicing service to the terminal device.

The communications network 300 may be a local area network (LAN), a metropolitan area network (MAN), a wide area network (WAN), a mobile network, a wired network, a wireless network, a private network or the like.

The method provided in one embodiment of the present disclosure may be performed by the server 200. The user may import to-be-spliced images to the App 101 in the terminal device 100, and the server 200 obtains these images from the App 101 of the terminal device 100, then splices the images and returns a spliced image to the App 101 of the terminal device 100. In this way, the user may obtain the spliced image from the terminal device 100.

Certainly, the method provided in the present disclosure may be performed in the server 200, and may also be performed in the terminal device 100, provided that computer programs corresponding to the image splicing method are stored in the terminal device 100, and the terminal device may run these computer programs. In this case, the terminal device is unnecessarily connected to the server, that is, the terminal device is unnecessarily in an online state.

It can be learned from this description that, the method provided in one embodiment of the present disclosure may be performed on the background by the server in which the computer programs corresponding to the image splicing method are stored, or may be performed offline by the terminal device in which the computer programs corresponding to the image splicing method are stored. Regardless of which hardware device performs the method, the hardware device falls within the protection scope of the present disclosure.

Figure 2A:
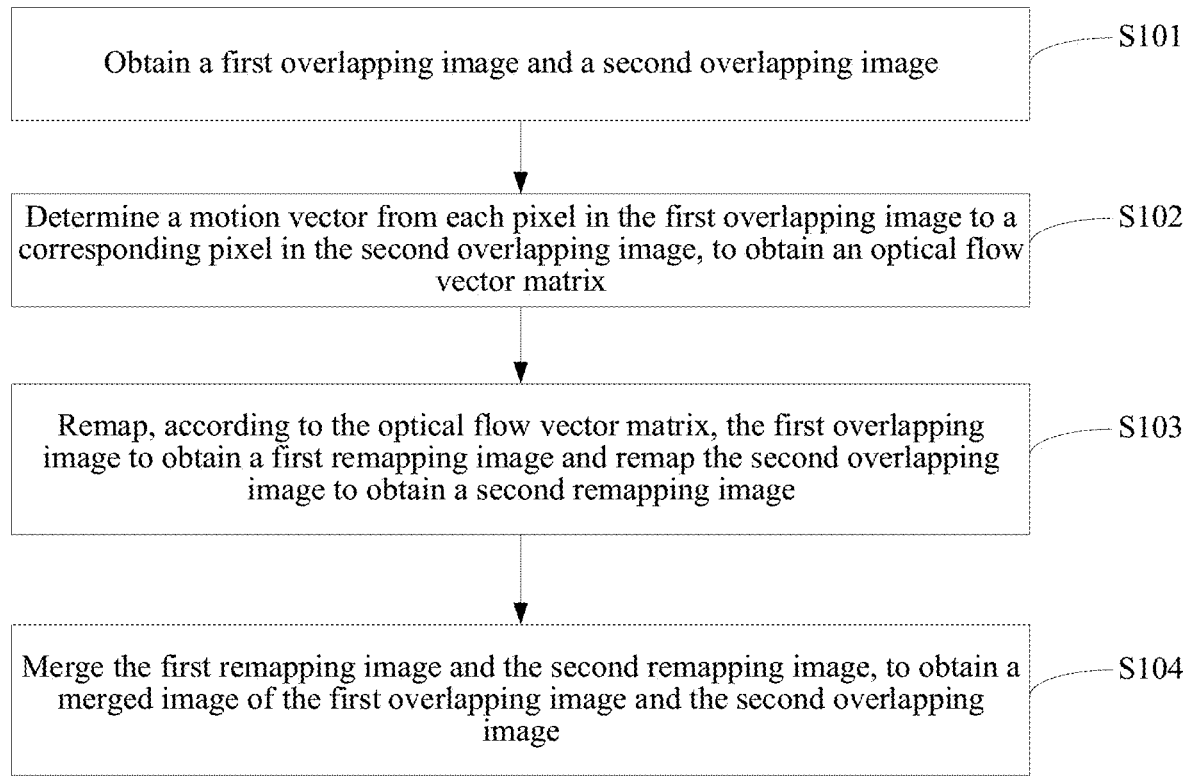
FIG. 2A is a schematic flowchart of an image splicing method according to an embodiment of the present disclosure.

As shown in FIG. 2A, the image splicing method provided in one embodiment of the present disclosure may include the followings.

S101. Obtain a first overlapping image and a second overlapping image from a first image and a second image. The first image and the second image are to-be-spliced neighboring images to create a spliced image. The first overlapping image is an area, in the first image, overlapped with the second image, and the second overlapping image is an area, in the second image, overlapped with the first image.

It may be understood that, in a process of splicing panoramic images or videos, a plurality of images captured by a plurality of cameras or a plurality of lens systems are partially overlapped with each other. In other words, two neighboring images are partially overlapped, an overlapping part in a first image is a first overlapping image, and an overlapping part in a second image is a second overlapping image.

Figure 3A:
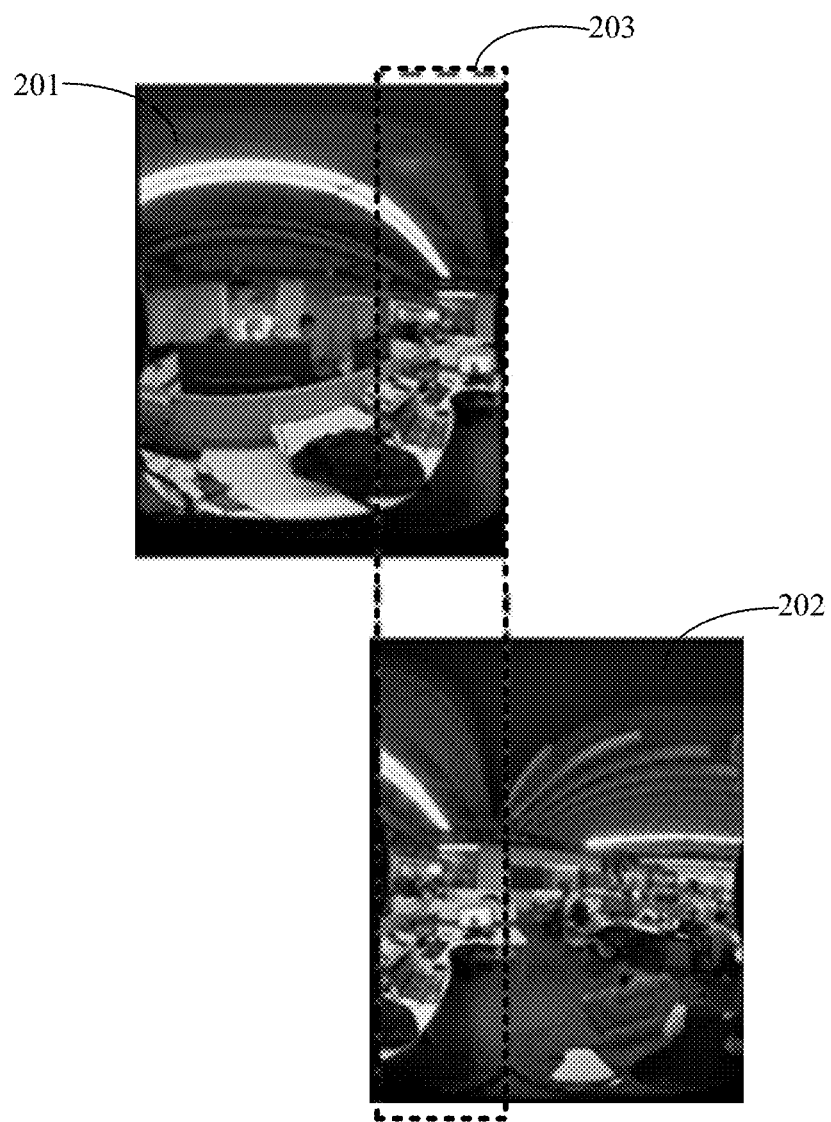
FIG. 3A is a schematic diagram of gray levels of a first image and a second image that are to be spliced according to an embodiment of the present disclosure.

A manner for splicing the first image and the second image may be left-right splicing, or may be up-down splicing. When two images are spliced in a left-right direction, assuming that the first image is an image located on the left side and the second image is an image located on the right side, the first overlapping image is a right part of the first image, and the second overlapping image is a left part of the second image. When two images are spliced in an up-down direction, assuming that the first image is an image located on the upper side and the second image is an image located on the lower side, the first overlapping image is a lower part of the first image, and the second overlapping image is an upper part of the second image. As shown in FIG. 3A, an upper image 201 is the first image, a lower image 202 is the second image, a part, located in a rectangular box 203, of the first image is the first overlapping image, and a part, located in the rectangular box, of the second image is the second overlapping image. It may be seen from FIG. 3A that, the first overlapping image and the second overlapping image have the same size.

During operation, panoramic projection conversion may be performed on the first image and the second image, to obtain the first overlapping image and the second overlapping image.

S102. Determine a motion vector from each pixel in the first overlapping image to a corresponding pixel in the second overlapping image, to obtain an optical flow vector matrix.

The motion vector, being a two-dimensional vector, includes a component in a horizontal direction and a component in a vertical direction. A location of a pixel in the first overlapping image may be different from a location of the pixel in the second overlapping image. In other words, the location is changed, and a change of this pixel in a direction x on and a change of this pixel in a direction y form a motion vector of the pixel. Motion vectors of all pixels in the first overlapping image form an optical flow vector matrix.

Figure 2B:
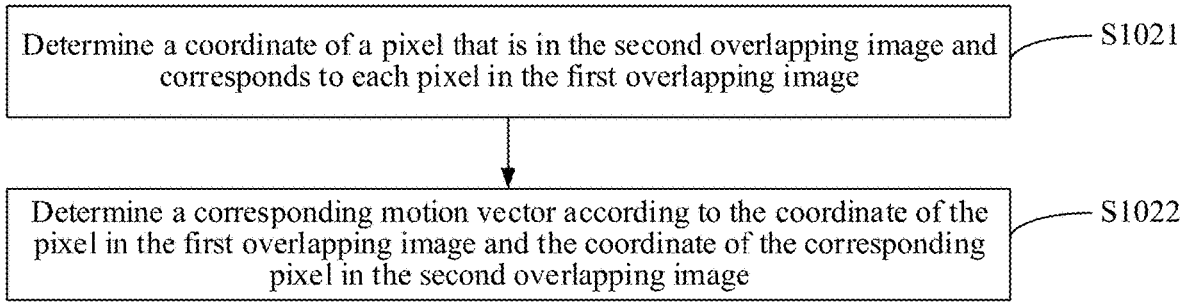
FIG. 2B is a schematic flowchart of calculating a motion vector according to an embodiment of the present disclosure.

Referring to FIG. 2B, a specific process of calculating the motion vector may include the followings.

S1021. Determine a coordinate of a pixel that is in the second overlapping image and corresponds to each pixel in the first overlapping image.

For a pixel in the first overlapping image, a coordinate of a corresponding pixel in the second overlapping image is determined in many ways, one of which is: determining sums of color values of all pixels, on all color channels, in an area (for example, a rectangular area) having the pixel (i, j) in the first overlapping image as the center; then determining a search area by taking a pixel (i, j) on the same location in the second overlapping image as the center; for each pixel in the search area, calculating sums of color values of all pixels, on all the color channels, in an area (for example, a rectangular area) having the pixel as the center; then calculating differences between the sums of the color values on all the color channels and a sum of color values of the pixel (i, j), on all the color channels, in the first overlapping image; and taking a pixel with a minimum difference as the pixel in the second overlapping image corresponding to the pixel (i, j) in the first overlapping image. Certainly, the pixel that is in the second overlapping image and corresponds to the pixel in the first overlapping image may be further determined in another way.

S1022. Determine a corresponding motion vector according to the coordinate of the pixel in the first overlapping image and the coordinate of the corresponding pixel in the second overlapping image.

Figure 4:
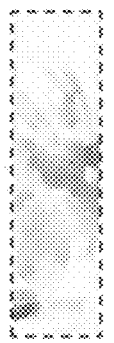
FIG. 4 is a schematic diagram of a gray level corresponding to an optical flow vector matrix according to an embodiment of the present disclosure.

It is assumed that the pixel (i, j) in the first overlapping image corresponds to the pixel (ii, jj) in the second overlapping image. Therefore, flow(i,j)·x=jj−j, flow(i,j)·y=ii−i, and flow(i,j)=(flow(i,j)·x, flow(i,j)·y), where flow(i,j) is the motion vector of the pixel (i, j) in the first overlapping image, flow(i,j)·x is a component of the motion vector in a horizontal direction, and flow(i,j)·y is a component in a vertical direction. FIG. 4 is a schematic diagram of a gray level of the optical flow vector matrix from the first overlapping image to the second overlapping image. A pixel in white has a motion vector of (0, 0), that is, has no displacement, a pixel in another color (or gray level) has a displacement, and different colors (or gray levels) represent different motion vectors, that is, different displacement values.

S103. Remap, according to the optical flow vector matrix, the first overlapping image to obtain a first remapping image and remap the second overlapping image to obtain a second remapping image.

Figure 3B:
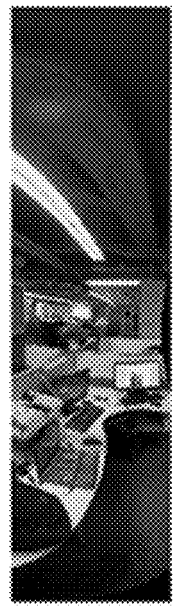
FIG. 3B is a schematic diagram of a gray level of a first overlapping image according to an embodiment of the present disclosure.
Figure 3C:
FIG. 3C is a schematic diagram of a gray level of a second overlapping image according to an embodiment of the present disclosure.

As shown in FIG. 3B and FIG. 3C, FIG. 3B is the first remapping image obtained after remapping the first overlapping image in FIG. 3A, and FIG. 3C is the second remapping image obtained after remapping the second overlapping image in FIG. 3A.

The optical flow vector matrix may reflect a difference between the first overlapping image and the second overlapping image. Thus, alignment between each pixel in the first overlapping image and a corresponding pixel in the second overlapping image may be implemented according to the optical flow vector matrix. Herein, a process of remapping the first overlapping image and the second overlapping image according to the optical flow vector matrix is actually a process of aligning pixels.

S104. Merge the first remapping image and the second remapping image, to obtain a merged image of the first overlapping image and the second overlapping image.

Herein, after the first remapping image and the second remapping image are merged, the merged image of the first overlapping image and the second overlapping image may be obtained, and then the merged image and non-overlapping parts of the first image and the second image jointly form a spliced image of the first image and the second image, to splice the two images. Other methods may also be used to obtain the spliced image of the first image and the second image. For example, the first overlapping image in the first image is replaced with the first remapping image, the second overlapping image in the second image is replaced with the second remapping image, and then the first image and the second image obtained after replacement are merged, so that the spliced image of the first image and the second image may be obtained. In other words, the image splicing method may further include: replacing the first overlapping image in the first image with the first remapping image, and replacing the second overlapping image in the second image with the second remapping image.

In this way, a specific process of step S104 may include: merging the first remapping image in the first image and the second remapping image in the second image, to obtain the spliced image of the first image and the second image. A process of merging the first image and the second image is actually a process of merging the first remapping image in the first image and the second remapping image in the second image. It may be understood that, the former manner is to first perform merging, obtain a merged image and then perform splicing, to obtain a spliced image, and the latter manner is to first perform image replacement, then perform merging, obtain a merged image and then obtain a spliced image. Regardless of which manner is used, the spliced image may be obtained according to the merged image. Therefore, in step S104, after the merged image is obtained, the spliced image of the first image and the second image may be determined according to the merged image.

Figure 3D:
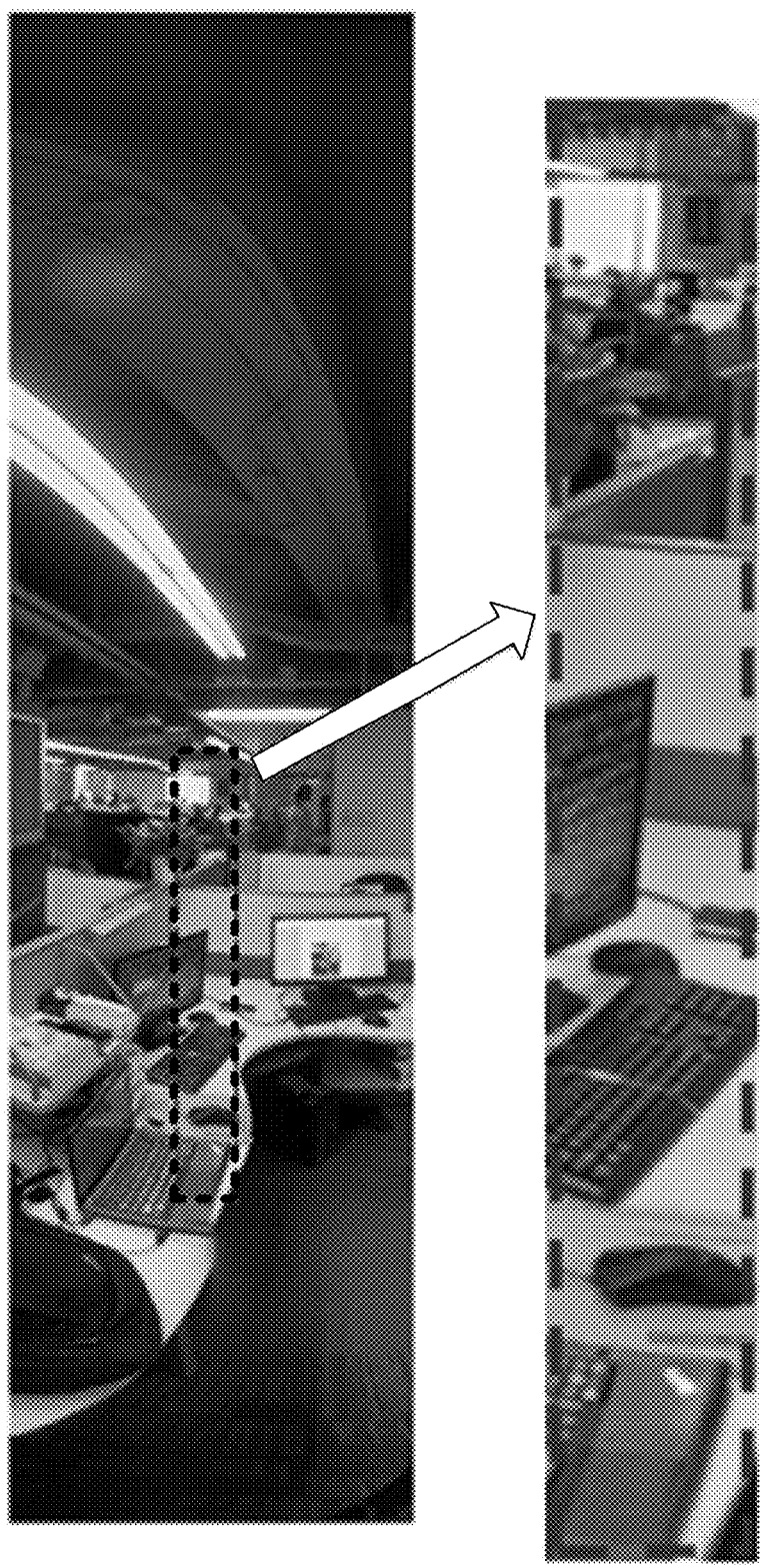
FIG. 3D is a schematic diagram of a gray level of a merged image according to an embodiment of the present disclosure.
Figure 3E:
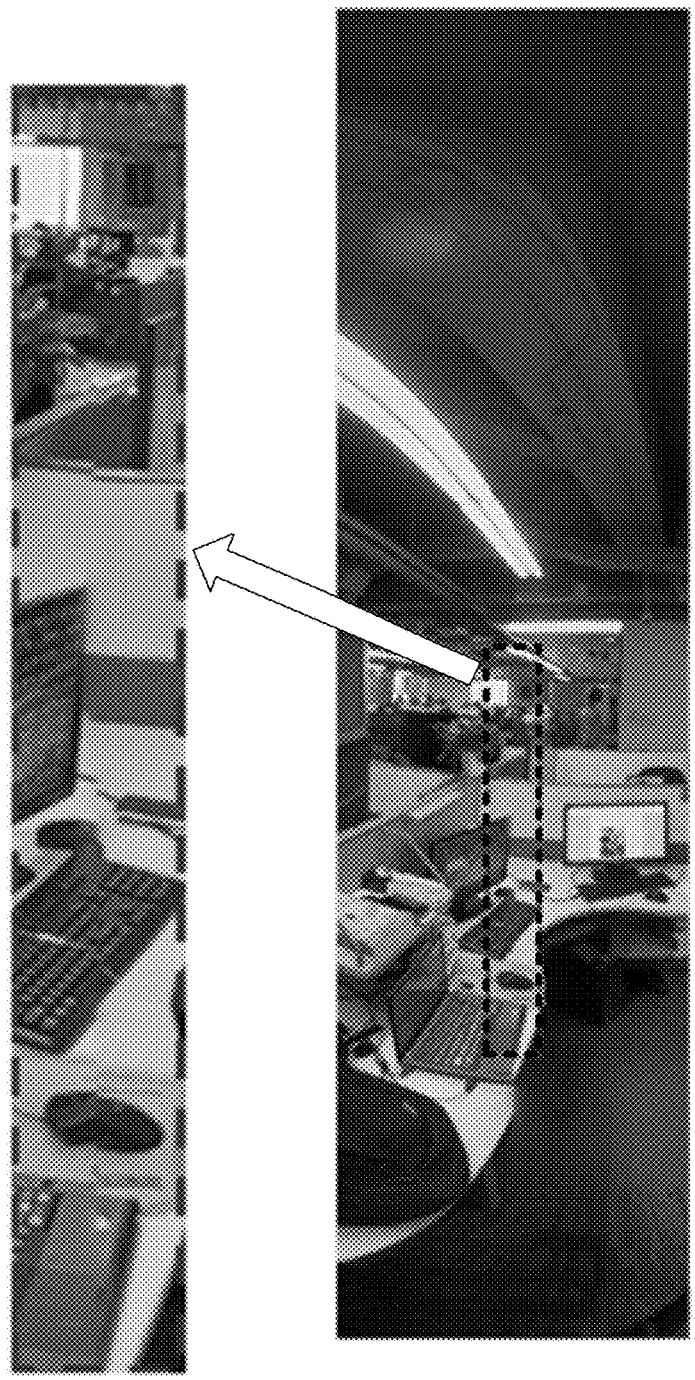
FIG. 3E is a schematic diagram of a gray level of a merged image obtained by splicing.

Based on the image splicing method provided in one embodiment of the present disclosure, before images are merged, a first overlapping image and a second overlapping image are remapped by using an optical flow vector matrix, so that pixels in an overlapping area are aligned one by one. Therefore, a problem such as fracture usually occurring in a splicing seam of the images or discordance can be alleviated, to be quite applicable to live broadcast of a panoramic video. As shown in FIG. 3D, a merged image obtained after merging FIG. 3B and FIG. 3C is on the left side in FIG. 3D, and an enlarged schematic diagram of an area in a dotted box in the merged image is on the right side in FIG. 3D. As shown in FIG. 3E, a merged image obtained after directly performing merging without performing remapping by using the optical flow vector matrix is on the right side in FIG. 3E, and an enlarged schematic diagram of an area in a dotted box in the merged image is on the left side in FIG. 3E. In FIG. 3E, obvious fracture occurs in a splicing seam, but in FIG. 3D, a problem such as fracture does not occur in a splicing seam. It can be learned that, before merging, remapping an overlapping image by using the optical flow vector matrix is a useful method for resolving the problem such as fracture.

In some embodiments, to control a transition change from the first overlapping image to the second overlapping image in the splicing process, before S103 is performed, the method provided in one embodiment of the present disclosure may further include: determining a transition weight matrix from the first overlapping image to the second overlapping image.

Figure 2C:
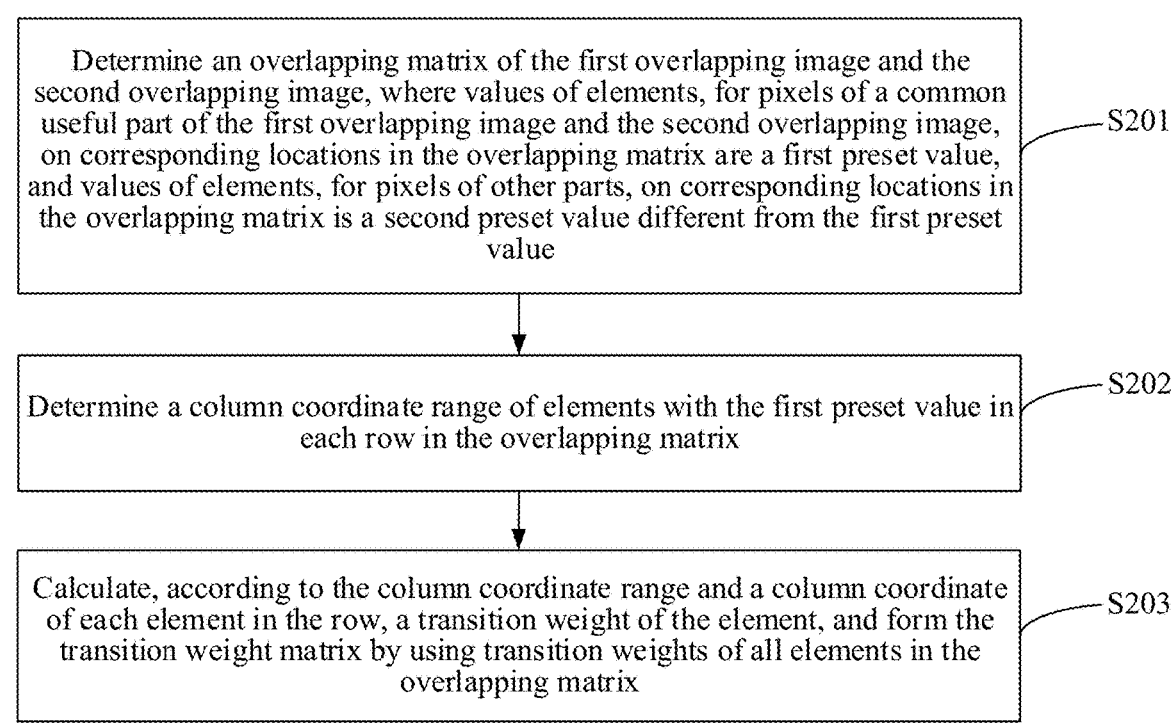
FIG. 2C is a schematic flowchart of determining a transition weight matrix according to an embodiment of the present disclosure.

In this way, step S103 may specifically include: remapping, according to the transition weight matrix and the optical flow vector matrix, the first overlapping image to obtain the first remapping image and remapping the second overlapping image to obtain the second remapping image. The transition weight matrix is determined in a plurality of manners. One of the manners is introduced below with reference to FIG. 2C.

S201. Determine an overlapping matrix of the first overlapping image and the second overlapping image, where values of elements, for pixels of a common useful part of the first overlapping image and the second overlapping image, on corresponding locations in the overlapping matrix are a first preset value, and values of elements, for pixels of other parts, on corresponding locations in the overlapping matrix is a second preset value different from the first preset value.

Figure 5:
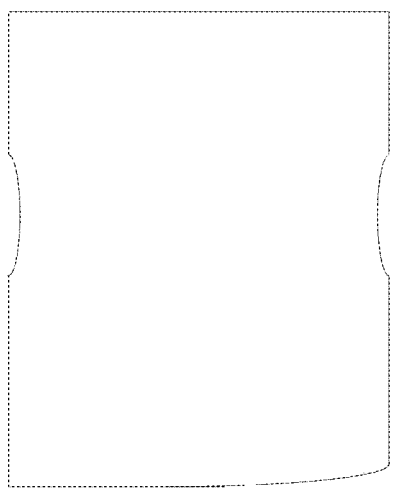
FIG. 5 is a schematic diagram of boundaries of a first image and a second image according to an embodiment of the present disclosure.

When an image is actually captured, the captured image is not truly rectangular. FIG. 5 is a schematic diagram of boundaries of the first image and the second image in FIG. 3A. It may be seen from the figure that, there is an arc-shaped depression on each of the left side, the right side and the bottom side of the first image and the second image, which is caused by a structure of a camera or lens. For the first overlapping image, the depression is located on the right side. For the second overlapping image, the depression is located on the left side. Moreover, there are depressions on parts of the bottom sides of both the first overlapping image and the second overlapping image, and there is not any actual image content on these depressions. Therefore, the depressions are useless. Therefore, "useful" in the step means that there is actual image content, and "useless" means that there is no actual image content.

In the overlapping matrix, a common useful part of the first overlapping image and the second overlapping image needs to be reflected, and other parts of the first overlapping image and the second overlapping image also need to be reflected. Therefore, the overlapping matrix has the same size as that of the first overlapping image and that of the second overlapping image. In other words, a quantity of elements in the overlapping matrix is the same as a quantity of pixels in each of the first overlapping image and the second overlapping image.

The first preset value and the second preset value may be autonomously set according to a requirement. For example, the first preset value is set to 255, and the second preset value is set to 0. In this way, if the overlapping matrix is converted into an image, a part corresponding to the common useful part of the first overlapping image and the second overlapping image is in white, and other parts are in black, as shown in FIG. 6.

S202. Determine a column coordinate range of elements with the first preset value in each row in the overlapping matrix.

Figure 6:
FIG. 6 is a schematic diagram corresponding to an overlapping matrix according to an embodiment of the present disclosure.

Using an example in which FIG. 6 shows an overlapping matrix corresponding to an image, a process of determining the column coordinate range is illustrated below.

The overlapping matrix is represented by using overlap, and for row i of the overlapping matrix overlap, a minimum column coordinate start_i and a maximum column coordinate end_i of the column coordinate range are initialized: start_i=W−1; and end_i=0, where W is a width of the overlapping matrix.

For row i, starting from j=0, the following operations are performed, until j=W−1:

If overlap (i, j)=255, whether corresponding j is less than start_i is determined; and if yes, start_i=j; otherwise, start_i is kept unchanged. Then, whether corresponding j is greater than end_i is determined; and if yes, end_i=j; otherwise, end_i is kept unchanged.

After each element in row i is traversed, final start_i and end_i are obtained. In this case, start_i is a minimum column coordinate of elements with the first preset value in row i, and end_i is a maximum column coordinate of the elements with the first preset value in row i.

For each row of overlap, start_i and end_i are initialized, and traversal is performed, to obtaining a column coordinate range of elements with the first preset value in each row, where i is traversed from 0 to H−1, and H is a height of the overlapping matrix overlap.

S203. Calculate, according to the column coordinate range and a column coordinate of each element in the row, a transition weight of the element, and form the transition weight matrix by using transition weights of all elements in the overlapping matrix.

A transition weight of each element is determined according to the column coordinate range of the elements with the first preset value in all the rows of the overlapping matrix in a plurality of manners, one of which may be: calculating a transition weight of an element of row i and column j in the overlapping matrix, that is, a value of an element of row i and column j in the transition weight matrix by using the following formula:

$$\text{Weight1}(i,j) = (\text{end\_}i - j)/(\text{end\_}i - \text{start\_}i) \quad (1)$$

where in the formula, Weight1(i,j) is the transition weight of the element of row i and column j in the overlapping matrix, and start_i is a minimum column coordinate in the column coordinate range in row i in the overlapping matrix; and end_i is a maximum column coordinate in the column coordinate range in row i in the overlapping matrix.

All elements in the overlapping matrix (including an element corresponding to the common useful part of the first overlapping image and the second overlapping image, and also including elements corresponding to other parts) are traversed by using the foregoing formula (1), to obtain a corresponding transition weight. In a process of performing calculation by using the foregoing formula (1), there may be a case in which a transition weight is greater than 1 or less than 0. If a transition weight is greater than 1, the transition weight greater than 1 may be set to 1; or if a transition weight is less than 0, the transition weight less than 0 may be set to 0, so that each element in the transition weight matrix is kept within a range of 0 to 1. FIG. 6 is a schematic diagram of a transition weight matrix. It can be learned that in the transition weight matrix, white becomes black from left to right. In other words, values of elements in columns in the transition weight matrix gradually become smaller.

Herein, the transition weight matrix is first calculated, and then the overlapping images are remapped by using the transition weight matrix and the optical flow vector matrix. Compared with a manner without using the transition weight matrix, smooth transition of the images may be performed, to further improve quality of the spliced image.

In some embodiments, referring to FIG. 2D, a process of remapping the first overlapping image and the second overlapping image according to the transition weight matrix and the optical flow vector matrix may include the followings.

S1031. Calculate a first transition mapping matrix and a second transition mapping matrix according to the optical flow vector matrix and the transition weight matrix, where the first transition mapping matrix is a transition mapping matrix from the first overlapping image to the second overlapping image, and the second transition mapping matrix is a transition mapping matrix from the second overlapping image to the first overlapping image.

During specific implementation, the first transition mapping matrix may be calculated in the following manner:

in a case that Weight1(i, j)=0, an element of row i and column j in the first transition mapping matrix is calculated by using the following formula (2):

$$\begin{cases} Warp1(i, j) \cdot x = j \\ Warp1(i, j) \cdot y = i \end{cases} \quad (2)$$

otherwise, an element of row i and column j in the first transition mapping matrix is calculated by using the following formula (3):

$$\begin{cases} Warp1(i, j) \cdot x = j\text{-flow}(i, j) \cdot x * (1\text{-Weight1}(i, j)) \\ Warp1(i, j) \cdot y = i\text{-flow}(i, j) \cdot y * (1\text{-Weight1}(i, j)) \end{cases} \quad (3)$$

where in the foregoing formulas (2) and (3), Weight1(i,j) is a value of an element of row i and column j in the transition weight matrix; Warp1(i,j) is a mapping vector represented by an element of row i and column j in the first transition mapping matrix; Warp1(i,j)·x is a component of the mapping vector in a horizontal direction; Warp1(i,j)·y is a component of the mapping vector in a vertical direction; flow(i,j) is a motion vector represented by an element of row i and column j in the optical flow vector matrix; flow(i,j)·y is a component of the motion vector in a vertical direction; and flow(i,j)·x is a component of the motion vector in a horizontal direction.

Similarly, the second transition mapping matrix may be calculated in the following manner:

in a case that Weight1(i, j)=0, an element of row i and column j in the second transition mapping matrix is calculated by using the following formulas (4) and (5):

$$\begin{cases} Warp2(i, j) \cdot x = j \\ Warp2(i, j) \cdot y = i \end{cases} \quad (4)$$

otherwise, an element of row i and column j in the second transition mapping matrix is calculated by using the following formula:

$$\begin{cases} Warp2(i, j) \cdot x = j\text{-flow}(i, j) \cdot x * (1\text{-Weight1}(i, j)) + \text{flow}(i, j) \cdot x \\ Warp2(i, j) \cdot y = i\text{-flow}(i, j) \cdot y * (1\text{-Weight1}(i, j)) + \text{flow}(i, j) \cdot y \end{cases} \quad (5)$$

where in the foregoing formulas (4) and (5), Warp2(i,j) is a mapping vector represented by an element of row i and column j in the second transition mapping matrix; Warp2(i,j)·x is a component of the mapping vector in a horizontal direction; and Warp2(i,j)·y is a component of the mapping vector in a vertical direction.

S1032. Remap the first overlapping image by using the first transition mapping matrix, to obtain the first remapping image; and remap the second overlapping image by using the second transition mapping matrix, to obtain the second remapping image.

A process of performing remapping to an image is actually a process of calculating color values of all pixels in a remapping image. During specific implementation, a color value of a pixel of row i and column j in the first remapping image may be calculated by using the following formula (6):

$$\text{overlap\_left\_dst}(i,j) = \text{overlap\_left\_src}(ii,jj) \quad (6)$$

where in the foregoing formula, overlap_left_dst(i,j) is the color value of the pixel of row i and column j in the first remapping image; overlap_left_src(ii,jj) is a color value of a pixel of row ii and column jj in the first overlapping image; ii=Warp1(i,j)·y, jj=Warp1(i,j)·x, and Warp1(i,j) is a mapping vector represented by an element of row i and column j in the first transition mapping matrix; Warp1(i,j)·x is a component of the mapping vector in a horizontal direction; and Warp1(i,j)·y is a component of the mapping vector in a vertical direction.

Similarly, a color value of a pixel of row i and column j in the second remapping image may be calculated by using the following formula (7):

$$\text{overlap\_right\_dst}(i,j) = \text{overlap\_right\_src}(ii,jj) \quad (7)$$

where in the formula, overlap_right_dst(i,j) is the color value of the pixel of row i and column j in the second remapping image, and overlap_right_src(ii,jj) is a color value of a pixel of row ii and column jj in the second remapping image; ii=Warp2(i,j)·y, jj=Warp2(i,j)·x, and Warp2(i,j) is a mapping vector represented by an element of row i and column j in the second transition mapping matrix; Warp2(i,j)·x is a component of the mapping vector in a horizontal direction; and Warp2(i,j)·y is a component of the mapping vector in a vertical direction.

Herein, the transition mapping matrix is first calculated, and then the overlapping images are remapped by using the transition mapping matrix. The overlapping images are remapped through this method, and the method is simple, and is easily implemented.

In some embodiments, for a process of performing merging in step S104, there are a plurality of ways of implementation. For example, image splicing may be implemented in the following merging manner with reference to FIG. 2E.

S1041. Determine a merging weight of a corresponding element according to a relationship between a transition weight of each element in the overlapping matrix and a preset threshold, and form a merging weight matrix by using merging weights of all elements in the overlapping matrix.

The preset threshold may be selected according to a requirement. This is not limited in one embodiment of the present disclosure.

A specific process of determining a merging weight may include: determining, in a case that a transition weight of the element is greater than the preset threshold, that the merging weight corresponding to the element is 1; otherwise, determining that the merging weight corresponding to the element is 0.

The step is described below by using an example in which the preset threshold is 0.5. A transition weight of each element in the overlapping matrix is a value of a corresponding element in the transition weight matrix. For Weight1(i,j), if Weight1(i,j) is greater than 0.5, Weight2(i,j) is 1; otherwise, Weight2(i,j) is 0. It can be learned that, a value of an element in the obtained merging weight matrix is either 1 or 0.

Figure 7A:
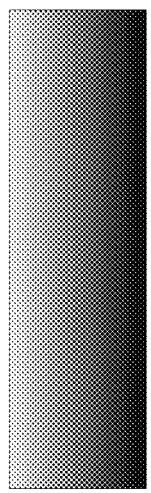
FIG. 7A is a schematic diagram corresponding to a transition weight matrix according to an embodiment of the present disclosure.
Figure 7B:
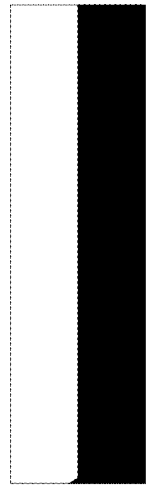
FIG. 7B is a schematic diagram corresponding to a blending weight matrix according to an embodiment of the present disclosure.

FIG. 7A is a schematic diagram of a transition weight matrix, and an image color gradually becomes darker from left to right. FIG. 7B is a schematic diagram of a merging weight matrix. It can be learned that there are only a black color and a white color in an image, and there is no transitional color.

S1042. Merge the first remapping image and the second remapping image by using the merging weight matrix.

In a specific process of performing merging, multiresolution merging may be used. As shown in FIG. 2F, a specific merging process may include the followings.

S10421. Establish respective Laplacian pyramids of the first remapping image and the second remapping image, and establish a Gaussian pyramid of the merging weight matrix.

The Laplacian pyramid and the Gaussian pyramid are each a multiresolution expression manner, and are different in that, for the Laplacian pyramid, more details may be reserved in a merging process, and for the Gaussian pyramid, a splicing seam may be blurred in a merging process. In other words, a small merging area is used in high frequency and a large merging area is used in low frequency. Therefore, original detail information of images can be maximally reserved at the same time of eliminating the splicing seam.

S10422. Merge the Laplacian pyramid of the first remapping image and the Laplacian pyramid of the second remapping image by using the Gaussian pyramid, to obtain a merging pyramid.

Because the Gaussian pyramid and the Laplacian pyramid each include a plurality of layers, pixels of rows i and columns j in layers level in the Laplacian pyramids of the first remapping image and the second remapping image may be merged by using the following formula (8):

$$\text{Result\_dst\_LS}(i,j,\text{level}) = \text{overlap\_left\_dst\_LS}(i,j,\text{level})$$
$$*\text{Weight2\_GR}(i,j,\text{level}) + \text{overlap\_right\_dst\_LS}(i,j,\text{level})*(1-\text{Weight2\_GR}(i,j,\text{level})) \quad (8)$$

where in the formula, Result_dst_LS(i,j, level) is a color value of a pixel of row i and column j in a layer level of the merging pyramid; overlap_left_dst_LS(i,j, level) is a color value of a pixel of row i and column j in a layer level of the Laplacian pyramid of the first remapping image; overlap_right_dst_LS(i,j, level) is a color value of a pixel of row i and column j in a layer level of the Laplacian pyramid of the second remapping image; and Weight2_GR(i,j, level) is a value of an element of row i and column j in a layer level of the Gaussian pyramid.

Each pixel in each layer in the Laplacian pyramid may be calculated by using the foregoing formula (8), to finally obtain a merging pyramid.

S10423. Perform image restoration on the merging pyramid, to obtain the merged image.

The restoration herein is a process of restoring an image pyramid to an image, which is just opposite to the foregoing process of generating the Laplacian pyramid according to the first remapping image and the second remapping image. Specifically, starting from a highest layer to a lowest layer, a layer is sequentially interpolated, enlarged and added to a next layer, to finally obtain an image, that is, a merged image. The merged image herein is the merged image of the first overlapping image and the second overlapping image, and needs to be added to non-overlapping parts of the first image and the second image, to form an entire spliced image of the first image and the second image.

For the Laplacian pyramid, more details may be reserved in a merging process, and for the Gaussian pyramid, a splicing seam may be blurred in a merging process. Therefore, original details information of images can be maximally reserved at the same time eliminating the splicing seam, to further improve quality of a spliced image.

In one embodiment of the present disclosure, the unit in an image is a pixel, and the unit in a matrix is an element. Actually, an image corresponds to a matrix, and a pixel also corresponds to an element.

According to another aspect, an embodiment of the present disclosure further provides an image splicing apparatus. The apparatus may be disposed on the server 200 in FIG. 1, or may be disposed on the terminal device 100 in FIG. 1. The apparatus includes: at least one memory; and at least one processor.

Figure 8:
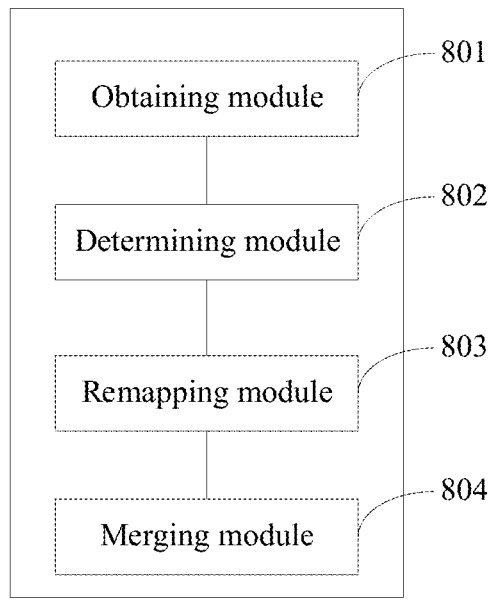
FIG. 8 is a structural block diagram of an image splicing apparatus according to an embodiment of the present disclosure.

The at least one memory stores at least one instruction module, configured to be executed by the at least one processor, as shown in FIG. 8. The at least one instruction module in the image splicing apparatus including: an obtaining module 801, a determining module 802, a remapping module 803, and a merging module 804, etc.

The obtaining module 801 obtains a first overlapping image and a second overlapping image, the first overlapping image being an area, in a first image, overlapped with a second image, the second overlapping image being an area, in the second image, overlapped with the first image, and the first image and the second image being to-be-spliced neighboring images.

The determining module 802 determines a motion vector from each pixel in the first overlapping image to a corresponding pixel in the second overlapping image, to obtain an optical flow vector matrix.

The remapping module 803 remaps, according to the optical flow vector matrix, the first overlapping image to obtain a first remapping image and remapping the second overlapping image to obtain a second remapping image.

The merging module 804 merges the first remapping image and the second remapping image, to obtain a merged image of the first overlapping image and the second overlapping image.

It may be understood that, the image splicing apparatus provided in one embodiment of the present disclosure is a function architecture module of the image splicing method provided in the embodiment in the first aspect. Therefore, for parts such as explanation, exemplification, and beneficial effects of related content in one embodiment of the present disclosure, refer to corresponding parts of the image splicing method provided in the embodiment in the first aspect. Details are not described herein again.

In some embodiments, the determining module 802 may further: determine a transition weight matrix from the first overlapping image to the second overlapping image; and the remapping module 803 may: remap, according to the optical flow vector matrix and the transition weight matrix, the first overlapping image to obtain the first remapping image and remap the second overlapping image to obtain the second remapping image.

In some embodiments, a process in which the determining module 802 determines a transition weight matrix from the first overlapping image to the second overlapping image includes: determining an overlapping matrix of the first overlapping image and the second overlapping image, where values of elements, for pixels of a common useful part of the first overlapping image and the second overlapping image, on corresponding locations in the overlapping matrix are a first preset value, and values of elements, for pixels of other parts, on corresponding locations in the overlapping matrix is a second preset value different from the first preset value; determining a column coordinate range of elements with the first preset value in each row in the overlapping matrix; and determining, according to the column coordinate range and a column coordinate of each element in the row, a transition weight of the element, and forming the transition weight matrix by using transition weights of all elements in the overlapping matrix.

In some embodiments, the determining module 802 may determine a transition weight of an element of row i and column j in the overlapping matrix by using the following formula:

Weight1$(i,j)$=(end_$i$–$j$)/(end_$i$–start_$i$)

where in the formula, Weight1$(i,j)$ is the transition weight of the element of row i and column j in the overlapping matrix, and start_$i$ is a minimum column coordinate in the column coordinate range in row i in the overlapping matrix; and end_$i$ is a maximum column coordinate in the column coordinate range in row i in the overlapping matrix.

In some embodiments, a process in which the remapping module 803 remaps the first overlapping image to obtain a first remapping image and remaps the second overlapping image to obtain a second remapping image may include: determining a first transition mapping matrix and a second transition mapping matrix according to the optical flow vector matrix and the transition weight matrix, where the first transition mapping matrix is a transition mapping matrix from the first overlapping image to the second overlapping image, and the second transition mapping matrix is a transition mapping matrix from the second overlapping image to the first overlapping image; and remapping the first overlapping image by using the first transition mapping matrix, to obtain the first remapping image; and remapping the second overlapping image by using the second transition mapping matrix, to obtain the second remapping image.

In some embodiments, a method in which the remapping module 803 determines the first transition mapping matrix may include:

in a case that Weight1$(i, j)$=0, determining an element of row i and column j in the first transition mapping matrix by using the following formula:

$$\begin{cases} Warp1(i, j) \cdot x = j \\ Warp1(i, j) \cdot y = i \end{cases}$$

otherwise, determining an element of row i and column j in the first transition mapping matrix by using the following formula:

$$\begin{cases} Warp1(i, j) \cdot x = j\text{-flow}(i, j) \cdot x * (1\text{-Weight1}(i, j)) \\ Warp1(i, j) \cdot y = i\text{-flow}(i, j) \cdot y * (1\text{-Weight1}(i, j)) \end{cases}$$

where in the foregoing formula, Weight1$(i,j)$ is a value of an element of row i and column j in the transition weight matrix; Warp1$(i,j)$ is a mapping vector represented by an element of row i and column j in the first transition mapping matrix; Warp1$(i,j)\cdot x$ is a component of the mapping vector in a horizontal direction; Warp1$(i,j)\cdot y$ is a component of the mapping vector in a vertical direction; flow$(i,j)$ is a motion vector represented by an element of row i and column j in the optical flow vector matrix; flow$(i,j)\cdot y$ is a component of the motion vector in a vertical direction; and flow$(i,j)\cdot x$ is a component of the motion vector in a horizontal direction.

In some embodiments, the remapping module 803 may determine a color value of a pixel of row i and column j in the first remapping image by using the following formula:

overlap_left_dst$(i,j)$=overlap_left_src$(ii,jj)$ where in the foregoing formula, overlap_left_dst$(i,j)$ is the color value of the pixel of row i and column j in the first remapping image; overlap_left_src$(ii,jj)$ is a color value of a pixel of row ii and column jj in the first overlapping image; ii=Warp1$(i,j)\cdot y$, jj=Warp1$(i,j)\cdot x$, and Warp1$(i,j)$ is a mapping vector represented by an element of row i and column j in the first transition mapping matrix; Warp1$(i,j)\cdot x$ is a component of the mapping vector in a horizontal direction; and Warp1$(i,j)\cdot y$ is a component of the mapping vector in a vertical direction.

In some embodiments, a method in which the remapping module 803 determines the second transition mapping matrix may include:

in a case that Weight1$(i,j)$=0, determining an element of row i and column j in the second transition mapping matrix by using the following formula:

$$\begin{cases} Warp2(i, j) \cdot x = j \\ Warp2(i, j) \cdot y = i \end{cases}$$

otherwise, determining an element of row i and column j in the second transition mapping matrix by using the following formula:

$$\begin{cases} Warp2(i, j) \cdot x = j\text{-flow}(i, j) \cdot x * (1\text{-Weight1}(i, j)) + \text{flow}(i, j) \cdot x \\ Warp2(i, j) \cdot y = i\text{-flow}(i, j) \cdot y * (1\text{-Weight1}(i, j)) + \text{flow}(i, j) \cdot y \end{cases}$$

where in the foregoing formula, Weight1$(i,j)$ is a value of an element of row i and column j in the transition weight matrix; Warp2$(i,j)$ is a mapping vector represented by an element of row i and column j in the second transition mapping matrix; Warp2$(i,j)\cdot x$ is a component of the mapping vector in a horizontal direction; Warp2$(i,j)\cdot y$ is a component of the mapping vector in a vertical direction; flow$(i,j)$ is a motion vector represented by an element of row i and column j in the optical flow vector matrix; flow$(i,j)\cdot y$ is a component of the motion vector in a vertical direction; and flow$(i,j)\cdot x$ is a component of the motion vector in a horizontal direction.

In some embodiments, the remapping module 803 may determine a color value of a pixel of row i and column j in the second remapping image by using the following formula:

overlap_right_dst$(i,j)$=overlap_right_src$(ii,jj)$ where in the formula, overlap_right_dst$(i,j)$ is the color value of the pixel of row i and column j in the second remapping image, and overlap_right_src(ii,jj) is a color value of a pixel of row ii and column jj in the second remapping image; ii=Warp2(i,j)·y, jj=Warp2(i,j)·x, and Warp2(i,j) is a mapping vector represented by an element of row i and column j in the second transition mapping matrix; Warp2(i,j)·x is a component of the mapping vector in a horizontal direction; and Warp2(i,j)·y is a component of the mapping vector in a vertical direction.

In some embodiments, the determining module 802 may further determine a merging weight of a corresponding element according to a relationship between a transition weight of each element in the overlapping matrix and a preset threshold, and form a merging weight matrix by using merging weights of all elements in the overlapping matrix; and the merging module 804 may merge the first remapping image and the second remapping image by using the merging weight matrix.

In some embodiments, a process in which the determining module 802 determines a merging weight of a corresponding element may include: determining, in a case that a transition weight of the element is greater than the preset threshold, that the merging weight corresponding to the element is 1; otherwise, determining that the merging weight corresponding to the element is 0.

In some embodiments, a process in which the merging module 804 blends the first remapping image and the second remapping image may include: establishing respective Laplacian pyramids of the first remapping image and the second remapping image, and establishing a Gaussian pyramid of the merging weight matrix; merging the Laplacian pyramid of the first remapping image and the Laplacian pyramid of the second remapping image by using the Gaussian pyramid, to obtain a merging pyramid; and performing image restoration on the merging pyramid, to obtain the merged image.

In some embodiments, the merging module 804 may merge pixels of rows i and columns j in layers level in the Laplacian pyramids of the first remapping image and the second remapping image by using the following formula:

$$\text{Result\_dst\_}LS(i,j,\text{level})=\text{overlap\_left\_dst\_}LS(i,j,\text{level})\\ *\text{Weight2\_}GR(i,j,\text{level})+\text{overlap\_right\_dst\_}LS(i,\\ j,\text{level})*(1-\text{Weight2\_}GR(i,j,\text{level}))$$

where in the formula, Result_dst_LS(i,j, level) is a color value of a pixel of row i and column j in a layer level of the merging pyramid; overlap_left_dst_LS(i,j, level) is a color value of a pixel of row i and column j in a layer level of the Laplacian pyramid of the first remapping image; overlap_right_dst_LS(i, j, level) is a color value of a pixel of row i and column j in a layer level of the Laplacian pyramid of the second remapping image; and Weight2_GR(ij, level) is a value of an element of row i and column j in a layer level of the Gaussian pyramid.

It may be understood that, because the foregoing modules correspond to the steps in the foregoing method, a structure of the image splicing apparatus provided in one embodiment of the present disclosure may also be described below.

The image splicing apparatus includes: at least one memory; and at least one processor. The at least one memory stores at least one instruction, and operations of the foregoing image splicing method is implemented in a case that the at least one instruction is executed by the at least one processor.

Some embodiments of the present disclosure further provide a non-volatile computer-readable storage medium, storing a computer program, and operations of any one of the foregoing methods being implemented in a case that the program is executed by a processor.

There are a plurality of storage mediums, for example, any medium that can store program code, such as a USB flash drive, a removable hard disk, a read-only memory (ROM), a random access memory (RAM), a magnetic disk, or an optical disc.

Figure 9:
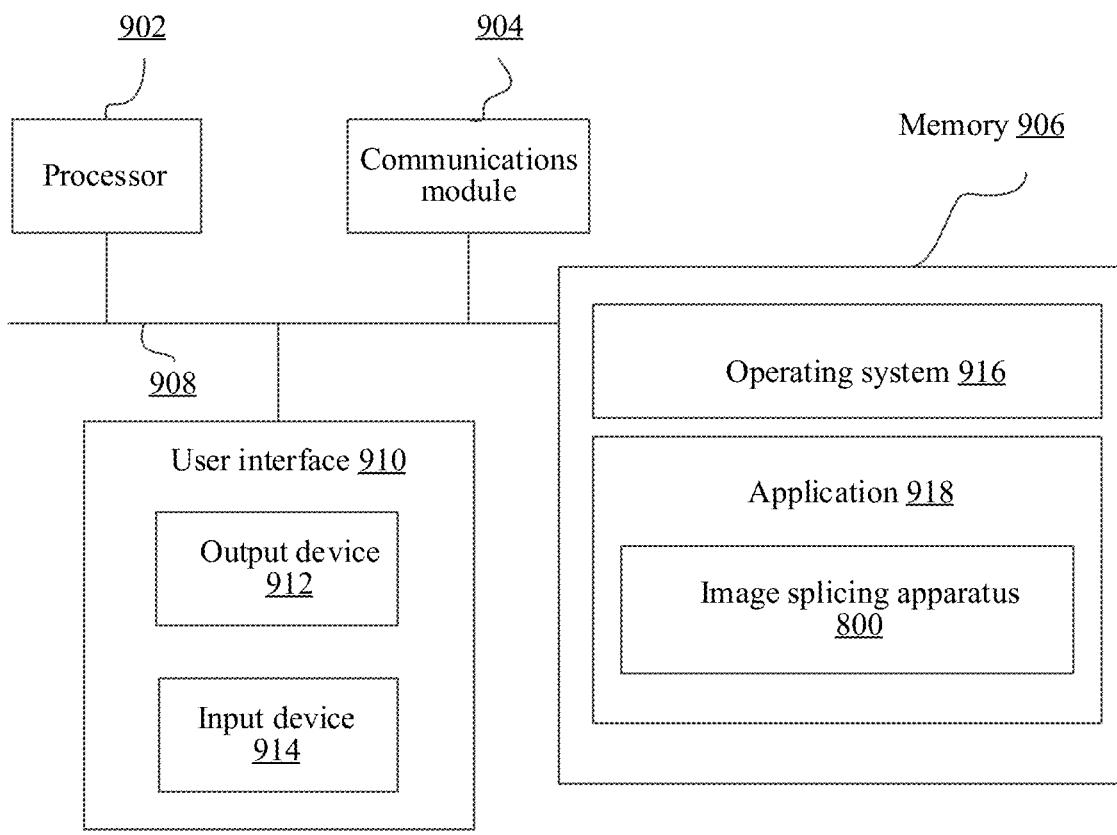
FIG. 9 is a structural block diagram of a computer device according to an embodiment of the present disclosure.

According to still another aspect, an embodiment of the present disclosure further provides a computer device. As shown in FIG. 9, the computer device includes one or more processors (CPU) 902, a communications module 904, a memory 906, a user interface 910, and a communications bus 908 that is configured to interconnect these components.

The processor 902 may receive and transmit data by using the communications module 904 to implement network communication and/or local communication.

The user interface 910 includes one or more output devices 912, including one or more speakers and/or one or more visualization displays. The user interface 910 further includes one or more input devices 914, including a keyboard, a mouse, a sound command input unit or a microphone, a touch display, a touch-sensitive input panel, a posture capturing camera, another input key or control, or the like.

The memory 906 may be a high-speed random access memory such as a DRAM, an SRAM, a DDR RAM, or other random access solid-state storage devices; or a non-volatile memory such as one or more magnetic disk storage devices, optical disc storage devices, flash memory devices, or other non-volatile solid-state storage devices.

The memory 906 stores an instruction set that can be executed by the processor 902 and includes: an operating system 916, including a program used for processing various basic system services and for executing hardware-related tasks; and an application 918, including various application programs for processing video lines, where such application programs can implement processing procedures in the foregoing embodiments, and for example, may include some or all of instruction modules or units in the image splicing apparatus 800. The processor 902 executes a machine-executable instruction of at least one of the units in the memory 906, to implement a function of at least one module in the foregoing units or modules.

Not all steps and modules in the procedures and the structural diagrams are necessary, and some steps or modules may be omitted according to an actual need. An execution sequence of the steps is not fixed and may be adjusted as needed. Division of the modules is merely functional division for ease of descriptions. During actual implementation, one module may include a plurality of modules, and functions of a plurality of modules may be implemented by a same module. These modules may be located in a same device or in different devices.

Hardware modules in the embodiments may be implemented by hardware or a hardware platform combined with software. The software includes machine-readable instructions, stored in a non-volatile storage medium. Therefore, the embodiments may alternatively be reflected as software products.

In the embodiments, the hardware may be implemented by dedicated hardware or hardware executing the machine-readable instructions. For example, the hardware may be a permanent circuit or logical device (for example, a special-purpose processor, such as an FPGA or an ASIC) that is specially designed to perform particular operations. Alternatively, the hardware may include a programmable logic device or circuit (for example, including a general-purpose processor or another programmable processor) that is temporarily configured by software to perform particular operations.

In addition, each embodiment of the present disclosure may be implemented by a data processing program executed by a data processing device such as a computer. In addition, generally, a data processing program stored in a storage medium is directly read from the storage medium for execution or the program is installed on or replicated to a storage device (such as a hard disk or an internal memory) of a data processing device for execution. The present disclosure further provides a non-volatile storage medium storing a data processing program. The data processing program may be used for performing any one of the foregoing embodiments of the present disclosure.

The machine-readable instructions corresponding to the modules in FIG. 9 can enable the operating system and the like running on the computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

According to the disclosed technical solutions in the present disclosure, before images are spliced, a first overlapping image and a second overlapping image are remapped by using an optical flow vector matrix, so that pixels in an overlapping area are aligned one by one. Therefore, a problem such as fracture usually occurring in a splicing seam of the images or discordance can be alleviated, to improve quality of a spliced image.

Only some embodiments of the present disclosure are described above, and are not intended to limit the present disclosure. Any modifications, equivalent variations, and improvements made in accordance with the spirits and principles of the present disclosure shall fall within the protection scope of the present disclosure.

What is claimed is:

1. An image splicing method, comprising:
    obtaining a first overlapping image and a second overlapping image from a first image and a second image, wherein the first overlapping image is an area, in a first image, overlapped with a second image; the second overlapping image is an area, in the second image, overlapped with the first image; and the first image and the second image are to-be-spliced neighboring images;
    determining a motion vector from each pixel in the first overlapping image to a corresponding pixel in the second overlapping image, to obtain an optical flow vector matrix;
    determining a transition weight matrix from the first overlapping image to the second overlapping image, by:
        determining an overlapping matrix of the first overlapping image and the second overlapping image, wherein elements of the overlapping matrix corresponding to a common part of the first and the second overlapping images are of a first preset value, and wherein elements of the overlapping matrix corresponding to other parts of the first and the second overlapping images are of a second preset value different from the first preset value; and
        forming the transition weight matrix according to the elements of the first preset value and the elements of the second preset value;
    determining a first transition mapping matrix and a second transition mapping matrix according to the optical flow vector matrix and the transition weight matrix, wherein the first transition mapping matrix is a transition mapping matrix from the first overlapping image to the second overlapping image, and the second transition mapping matrix is a transition mapping matrix from the second overlapping image to the first overlapping image;
    remapping the first overlapping image by using the first transition mapping matrix to obtain a first remapping image, and remapping the second overlapping image by using the second transition mapping matrix to obtain a second remapping image; and
    merging the first remapping image and the second remapping image, to obtain a merged image of the first overlapping image and the second overlapping image, and determining a spliced image of the first image and the second image according to the merged image.

2. The method according to claim 1, wherein the determining a transition weight matrix from the first overlapping image to the second overlapping image comprises:
    determining a column coordinate range of elements with the first preset value in each row in the overlapping matrix; and
    determining, according to the column coordinate range and a column coordinate of each element in the row, a transition weight of the element, and forming the transition weight matrix by using transition weights of all elements in the overlapping matrix.

3. The method according to claim 2, wherein a transition weight of an element of row i and column j in the overlapping matrix is determined by:

Weight1$(i,j)$=(end_$i$−$j$)/(end_$i$−start_$i$)

wherein Weight1$(i,j)$ is the transition weight of the element of row i and column j in the overlapping matrix, and start_$i$ is a minimum column coordinate in the column coordinate range in row i in the overlapping matrix; and end_$i$ is a maximum column coordinate in the column coordinate range in row i in the overlapping matrix.

4. The method according to claim 1, wherein
in a case that Weight1$(i,j)$=0, an element of row i and column j in the first transition mapping matrix is determined by:

$$\begin{cases} Warp1(i, j) \cdot x = j \\ Warp1(i, j) \cdot y = i \end{cases}$$

otherwise, an element of row i and column j in the first transition mapping matrix is determined by:

$$\begin{cases} Warp1(i, j) \cdot x = j\text{-flow}(i, j) \cdot x * (1\text{-Weight1}(i, j)) \\ Warp1(i, j) \cdot y = i\text{-flow}(i, j) \cdot y * (1\text{-Weight1}(i, j)) \end{cases}$$

wherein Weight1$(i,j)$ is a value of an element of row i and column j in the transition weight matrix; Warp1$(i,j)$ is a mapping vector represented by an element of row i and column j in the first transition mapping matrix;

Warp1(i,j)·x is a component of the mapping vector in a horizontal direction; Warp1(i,j)·y is a component of the mapping vector in a vertical direction; flow(i,j) is a motion vector represented by an element of row i and column j in the optical flow vector matrix; flow(i,j)·y is a component of the motion vector in a vertical direction; and flow(i,j)·x is a component of the motion vector in a horizontal direction.

5. The method according to claim 1, wherein the remapping the first overlapping image, to obtain the first remapping image comprises:
determining a color value of a pixel of row i and column j in the first remapping image by:

overlap_left_dst(i,j)=overlap_left_src(ii,jj)

wherein overlap_left_dst(i,j) is the color value of the pixel of row i and column j in the first remapping image; overlap_left_src(ii,jj) is a color value of a pixel of row ii and column jj in the first overlapping image; ii=Warp1(i,j)·y, jj=Warp1(i,j)·x, and Warp1(i,j) is a mapping vector represented by an element of row i and column j in the first transition mapping matrix;
Warp1(i,j)·x is a component of the mapping vector in a horizontal direction; and Warp1(i,j)·y is a component of the mapping vector in a vertical direction.

6. The method according to claim 1, wherein
in a case that Weight1(i,j)=0, an element of row i and column j in the second transition mapping matrix is determined by:

$$\begin{cases} Warp2(i, j) \cdot x = j \\ Warp2(i, j) \cdot y = i \end{cases}$$

otherwise, an element of row i and column j in the second transition mapping matrix is determined by:

$$\begin{cases} Warp2(i, j) \cdot x = j\text{-flow}(i, j) \cdot x * (1\text{-Weight1}(i, j)) + \text{flow}(i, j) \cdot x \\ Warp2(i, j) \cdot y = i\text{-flow}(i, j) \cdot y * (1\text{-Weight1}(i, j)) + \text{flow}(i, j) \cdot y \end{cases}$$

wherein Weight1(i,j) is a value of an element of row i and column j in the transition weight matrix; Warp2(i,j) is a mapping vector represented by an element of row i and column j in the second transition mapping matrix; Warp2(i,j)·x is a component of the mapping vector in a horizontal direction; Warp2(i,j)·y is a component of the mapping vector in a vertical direction; flow(i,j) is a motion vector represented by an element of row i and column j in the optical flow vector matrix; flow(i,j)·y is a component of the motion vector in a vertical direction; and flow(i,j)·x is a component of the motion vector in a horizontal direction.

7. The method according to claim 1, wherein the remapping the second overlapping image, to obtain the second remapping image comprises:
determining a color value of a pixel of row i and column j in the second remapping image by:

overlap_right_dst(i,j)=overlap_right_src(ii,jj)

wherein overlap_right_dst(i,j) is the color value of the pixel of row i and column j in the second remapping image, and overlap_right_src(ii,jj) is a color value of a pixel of row ii and column jj in the second remapping image; ii=Warp2(i,j)·y, jj=Warp2(i,j)·x, and Warp2(i,j) is a mapping vector represented by an element of row i and column j in the second transition mapping matrix; Warp2(i,j)·x is a component of the mapping vector in a horizontal direction; and Warp2(i,j)·y is a component of the mapping vector in a vertical direction.

8. The method according to claim 2, further comprising:
determining a merging weight of a corresponding element according to a relationship between a transition weight of each element in the overlapping matrix and a preset threshold, and forming a merging weight matrix by using merging weights of all elements in the overlapping matrix; and the merging the first remapping image and the second remapping image comprises:
merging the first remapping image and the second remapping image by using the merging weight matrix.

9. The method according to claim 8, wherein the determining a merging weight of a corresponding element comprises: determining, in a case that a transition weight of the element is greater than the preset threshold, that the merging weight corresponding to the element is 1; otherwise, determining that the merging weight corresponding to the element is 0.

10. The method according to claim 8, wherein the merging the first remapping image and the second remapping image by using the merging weight matrix comprises:
establishing respective Laplacian pyramids of the first remapping image and the second remapping image, and establishing a Gaussian pyramid of the merging weight matrix;
merging the Laplacian pyramid of the first remapping image and the Laplacian pyramid of the second remapping image by using the Gaussian pyramid, to obtain a merging pyramid; and
performing image restoration on the merging pyramid, to obtain the merged image.

11. The method according to claim 10, wherein pixels of rows i and columns j in layers level in the Laplacian pyramids of the first remapping image and the second remapping image are merged by:

Result_dst_LS(i,j,level)=overlap_left_dst_LS(i,j, level)*Weight2_GR(i,j,level)+overlap_right_dst_LS(i,j,level)*(1−Weight2_GR(i,j,level))

wherein Result_dst_LS(i,j, level) is a color value of a pixel of row i and column j in a layer level of the merging pyramid; overlap_left_dst_LS(i,j, level) is a color value of a pixel of row i and column j in a layer level of the Laplacian pyramid of the first remapping image; overlap_right_dst_LS(i,j, level) is a color value of a pixel of row i and column j in a layer level of the Laplacian pyramid of the second remapping image; and Weight2_GR(i,j, level) is a value of an element of row i and column j in a layer level of the Gaussian pyramid.

12. An image splicing apparatus, comprising: at least one memory storing computer instructions; and at least one processor coupled to the at least one memory to execute the computer instructions to perform:
obtaining a first overlapping image and a second overlapping image from a first image and a second image, wherein the first overlapping image is an area, in a first image, overlapped with a second image; the second overlapping image is an area, in the second image, overlapped with the first image; and the first image and the second image are to-be-spliced neighboring images; determining a motion vector from each pixel in the first overlapping image to a corresponding pixel in the second overlapping image, to obtain an optical flow vector matrix;

determining a transition weight matrix from the first overlapping image to the second overlapping image, by:

determining an overlapping matrix of the first overlapping image and the second overlapping image, wherein elements of the overlapping matrix corresponding to a common part of the first and the second overlapping images are of a first preset value, and wherein elements of the overlapping matrix corresponding to other parts of the first and the second overlapping images are of a second preset value different from the first preset value; and forming the transition weight matrix according to the elements of the first preset value and the elements of the second preset value;

determining a first transition mapping matrix and a second transition mapping matrix according to the optical flow vector matrix and the transition weight matrix, wherein the first transition mapping matrix is a transition mapping matrix from the first overlapping image to the second overlapping image, and the second transition mapping matrix is a transition mapping matrix from the second overlapping image to the first overlapping image;

remapping the first overlapping image by using the first transition mapping matrix to obtain a first remapping image, and remapping the second overlapping image by using the second transition mapping matrix to obtain a second remapping image; and merging the first remapping image and the second remapping image, to obtain a merged image of the first overlapping image and the second overlapping image, and determining a spliced image of the first image and the second image according to the merged image.

13. The apparatus according to claim 12, wherein the determining a transition weight matrix from the first overlapping image to the second overlapping image comprises:

determining a column coordinate range of elements with the first preset value in each row in the overlapping matrix; and determining, according to the column coordinate range and a column coordinate of each element in the row, a transition weight of the element, and forming the transition weight matrix by using transition weights of all elements in the overlapping matrix.

14. The apparatus according to claim 13, wherein a transition weight of an element of row i and column j in the overlapping matrix is determined by:

$$\text{Weight1}(i,j)=(\text{end\_}i-j)/(\text{end\_}i-\text{start\_}i)$$

wherein Weight1(i,j) is the transition weight of the element of row i and column j in the overlapping matrix, and start_i is a minimum column coordinate in the column coordinate range in row i in the overlapping matrix; and end_i is a maximum column coordinate in the column coordinate range in row i in the overlapping matrix.

15. A non-transitory computer-readable storage medium storing computer program instructions executable by at least one processor to perform:

obtaining a first overlapping image and a second overlapping image from a first image and a second image, wherein the first overlapping image is an area, in a first image, overlapped with a second image; the second overlapping image is an area, in the second image, overlapped with the first image; and the first image and the second image are to-be-spliced neighboring images;

determining a motion vector from each pixel in the first overlapping image to a corresponding pixel in the second overlapping image, to obtain an optical flow vector matrix;

determining a transition weight matrix from the first overlapping image to the second overlapping image, by:

determining an overlapping matrix of the first overlapping image and the second overlapping image, wherein elements of the overlapping matrix corresponding to a common part of the first and the second overlapping images are of a first preset value, and wherein elements of the overlapping matrix corresponding to other parts of the first and the second overlapping images are of a second preset value different from the first preset value; and forming the transition weight matrix according to the elements of the first preset value and the elements of the second preset value;

determining a first transition mapping matrix and a second transition mapping matrix according to the optical flow vector matrix and the transition weight matrix, wherein the first transition mapping matrix is a transition mapping matrix from the first overlapping image to the second overlapping image, and the second transition mapping matrix is a transition mapping matrix from the second overlapping image to the first overlapping image;

remapping the first overlapping image by using the first transition mapping matrix to obtain a first remapping image, and remapping the second overlapping image by using the second transition mapping matrix to obtain a second remapping image; and merging the first remapping image and the second remapping image, to obtain a merged image of the first overlapping image and the second overlapping image, and determining a spliced image of the first image and the second image according to the merged image.

16. The non-transitory computer-readable storage medium according to claim 15, wherein the determining a transition weight matrix from the first overlapping image to the second overlapping image comprises:

determining a column coordinate range of elements with the first preset value in each row in the overlapping matrix; and determining, according to the column coordinate range and a column coordinate of each element in the row, a transition weight of the element, and forming the transition weight matrix by using transition weights of all elements in the overlapping matrix.

* * * * *